United States Patent
Karnati et al.

(10) Patent No.: US 8,788,783 B1
(45) Date of Patent: Jul. 22, 2014

(54) DYNAMICALLY TUNING THE SIZE OF A CACHE STORED IN A SHARED MEMORY

(75) Inventors: Sravana Kumar Karnati, Seattle, WA (US); Guy A. Molinari, Renton, WA (US); David T. Parkinson, Seattle, WA (US)

(73) Assignee: Disney Enterprises, Inc., Burbank, CA (US)

( * ) Notice: Subject to any disclaimer, the term of this patent is extended or adjusted under 35 U.S.C. 154(b) by 632 days.

(21) Appl. No.: 12/818,896

(22) Filed: Jun. 18, 2010

(51) Int. Cl.
 *G06F 12/00* (2006.01)
(52) U.S. Cl.
 USPC ........................................... 711/170; 711/118
(58) Field of Classification Search
 USPC ..................................... 12/118; 711/118, 170
 See application file for complete search history.

(56) References Cited

U.S. PATENT DOCUMENTS

| | | | | |
|---|---|---|---|---|
| 7,461,231 B2 * | 12/2008 | Branda et al. | ................. | 711/173 |
| 2004/0230753 A1 * | 11/2004 | Amiri et al. | ................... | 711/147 |
| 2005/0071599 A1 * | 3/2005 | Modha et al. | ................. | 711/170 |

OTHER PUBLICATIONS

Glenn Ledder, The Concept of the Derivative, Jan. 24, 2002, http://www.math.unl.edu/~gledder1/Math208/DerivativeConcept.pdf.*
PreMBA, "Precalculus: Slope and Derivatives", Sep. 10, 2006.*

* cited by examiner

*Primary Examiner* — Kalpit Parikh
(74) *Attorney, Agent, or Firm* — Patterson & Sheridan, LLP

(57) ABSTRACT

A system and method configured to dynamically tune the size of a cache stored in a shared memory minimizes the amount of the shared memory consumed by the cache while achieving a desired cache hit ratio. A maximum size of the cache is computed based on a slope, the current cache size, a target hit ratio, and a current hit ratio. The maximum size is then used to dynamically adjust the size of the cache, decreasing or increasing the size based on the computed maximum size.

20 Claims, 5 Drawing Sheets

DYNAMICALLY TUNING THE SIZE OF A CACHE STORED IN A SHARED MEMORY

BACKGROUND

1. Field of the Invention

The present invention relates to the field of caching and, in particular, to a system and method for dynamically tuning the size of a cache stored in a shared memory.

2. Description of the Related Art

A cache for web-based content is stored in a shared memory with other applications and data. In a conventional system, the size of the cache may be fixed at a particular value in an effort to achieve a desired hit ratio. When the desired hit ratio is not achieved the system may be manually reconfigured to use a different value for the cache size. The frequency of a change to the cache size is typically once a day or once every few days. Determining the optimal cache size is important to balance cache performance, measured by the hit rate, while minimizing the amount of the shared memory that is consumed by the cache.

As the foregoing illustrates, there is a need in the art for an improved technique for tuning the size of the cache to minimize the amount of the shared memory consumed by the cache while achieving a desired cache hit ratio.

SUMMARY

Embodiments of the invention include a system and method for dynamically tuning the size of the cache to minimize the amount of the shared memory consumed by the cache while achieving a desired cache hit ratio. A maximum size of the cache is computed based on a slope, the current cache size, a target hit ratio, and a current hit ratio. The maximum size is then used to dynamically adjust the size of the cache, decreasing or increasing the size based on the computed maximum size.

One embodiment of the invention provides a computer-implemented method for dynamically tuning the size of a cache stored in a shared memory. The method includes determining a cumulative hit ratio for the dynamically-sized cache as the ratio of a first number of cache reads of data that is stored in the dynamically-sized cache (cache hits) to a sum of the first number and a second number of cache reads of data that is not stored in the dynamically-sized cache (cache misses) and computing a slope as a first order derivative of a cumulative hit ratio of the cache with respect to a size of the cache associated with each hit ratio. A maximum value that limits the size of the cache stored in the shared memory is computed based on the slope and the size of the cache in the shared memory is adjusted based on the maximum value.

One advantage of the techniques described herein is that the size of the cache is dynamically tuned based on the computed maximum size of the cache. The cache performance is improved as the size is increased and the memory utilization is improved as the size is decreased. The cache size is dynamically tuned to adapt based on the accesses and resources that are available.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF EXEMPLARY EMBODIMENTS

The system and method for tuning the size of a cache stored in a shared memory may be used in a web content caching environment to improve access performance and/or memory utilization of a web server or server farm.

The system and method for tuning the size of a cache stored in the shared memory can be implemented in hardware, software, or a combination of hardware and software. When implemented in hardware, the system and method for tuning the size of a cache stored in the shared memory can be implemented using specialized hardware elements and logic. When the system and method for tuning the size of a cache stored in the shared memory is implemented in software, the software can be used to control the various components in a system and network associated with the program. The software can be stored in a memory and executed by a suitable instruction execution system (microprocessor). The hardware implementation of the system and method for tuning the size of a cache stored in the shared memory can include any or a combination of the following technologies, which are all well known in the art: discrete electronic components, a discrete logic circuit(s) having logic gates for implementing logic functions upon data signals, an application specific integrated circuit having appropriate logic gates, a programmable gate array(s) (PGA), a field programmable gate array (FPGA), etc.

The software for tuning the size of a cache stored in the shared memory comprises an ordered listing of executable instructions for implementing logical functions, and can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

Figure 1:
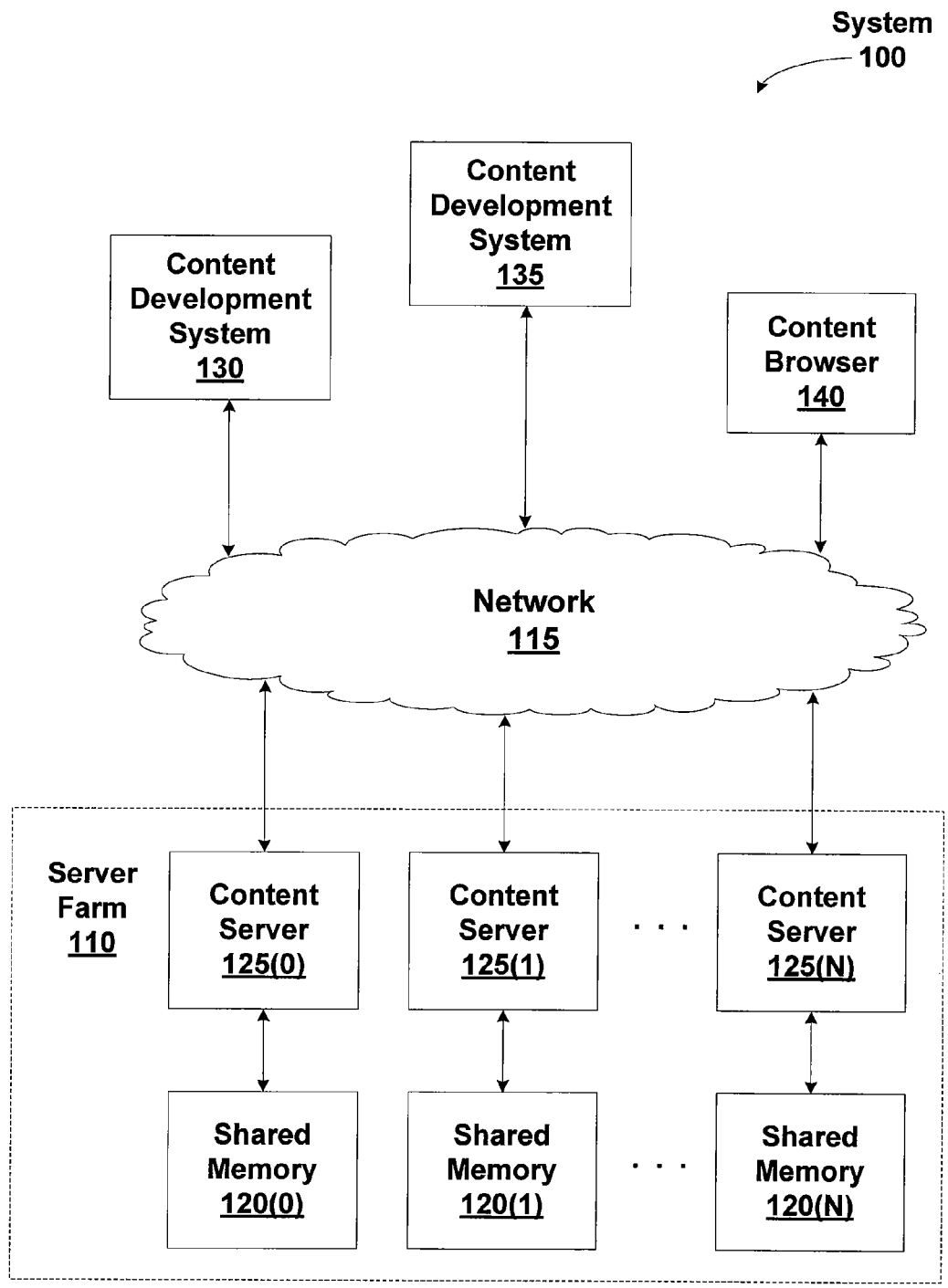
FIG. 1 is a block diagram of a system configured to implement one or more aspects of the present invention.

FIG. 1 is a block diagram illustrating an example of a system 100 that can implement the system for tuning the size of a cache stored in the shared memory. The system 100 includes a server farm 110, a network 115, one or more content development systems 130 and 135, and a content browser 140. The server farm 110 includes one to N+1 content servers 125 that are each coupled to a shared memory 120. A dynamically-sized cache is co-located in the shared memory 120 with other data. The dynamically-sized cache is configured to store data that is transferred over the network 115, such as web content. A user may development content on content development system 130 and/or 135 and transfer the content via the network 115 for storage in one or more of the shared memories 120.

The network 115 may connect different systems via a local area network (LAN), wide area network (WAN), or the internet through wired and/or wireless connections. The portion of the shared memory 120 that is not configured as a dynamically-sized cache may store data such as text, key value pairs, web content, and the like. Data stored in the shared memory 120 may be accessed through the corresponding content server 125 by content development systems 130 and 135 and content browser 140.

Figure 2:
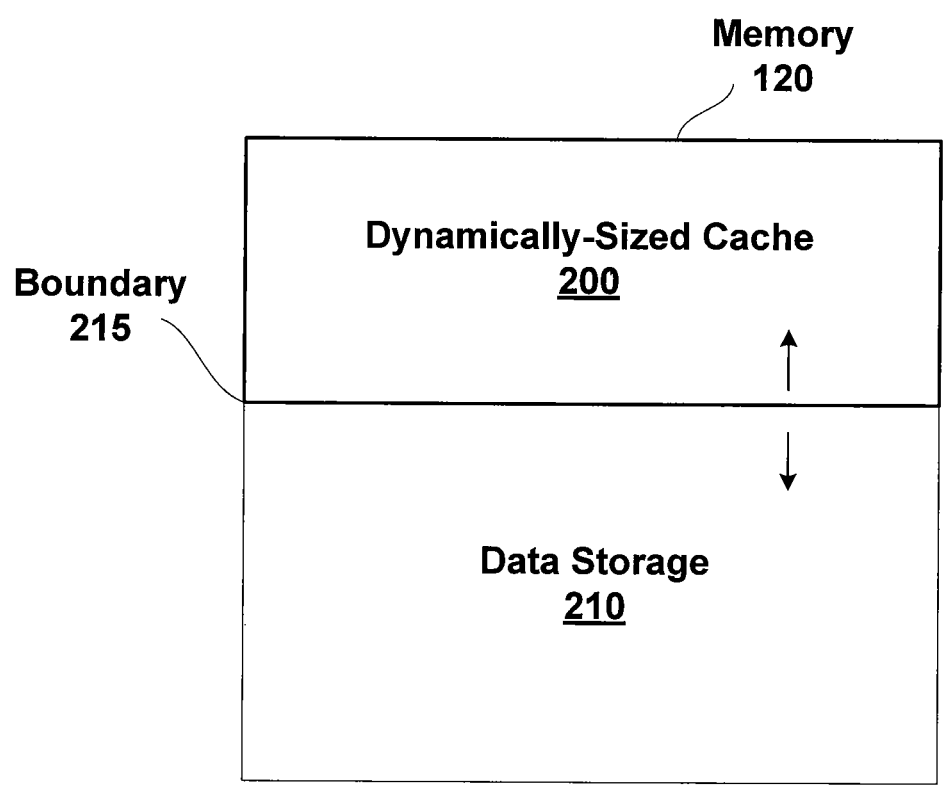
FIG. 2 is a diagram of the shared memory, according to one embodiment of the invention.

FIG. 2 is a diagram of the shared memory 120, according to one embodiment of the invention. A dynamically-sized cache 200 is stored in a first portion of the memory 120. Other data may be stored in a data storage 210 that is the remaining portion of the memory 120. The other data stored in the remaining portion of data storage 210 may include data structure that manage state of other applications, the operating system, or software infrastructure components external to the dynamically-sized cache 200. A boundary 215 separates the dynamically-sized cache 200 from the data storage 210. The boundary 215 adjusts as the size of the dynamically-sized cache 200 increases or decreases. Although the first portion and remaining portion of the memory 120 are divided by the boundary 215 into separate contiguous portions of the memory 120, in another embodiment entries of the dynamically-sized cache 200 are not stored in contiguous locations of the memory 120, but are instead interleaved with locations of the memory 120 that are configured as data storage 210. Importantly, the dynamically-sized cache 200 is not configured to cache data that is stored in data storage 210. Instead, the dynamically-sized cache 200 is configured to store data that is accessed via the content server 125.

Figure 3:
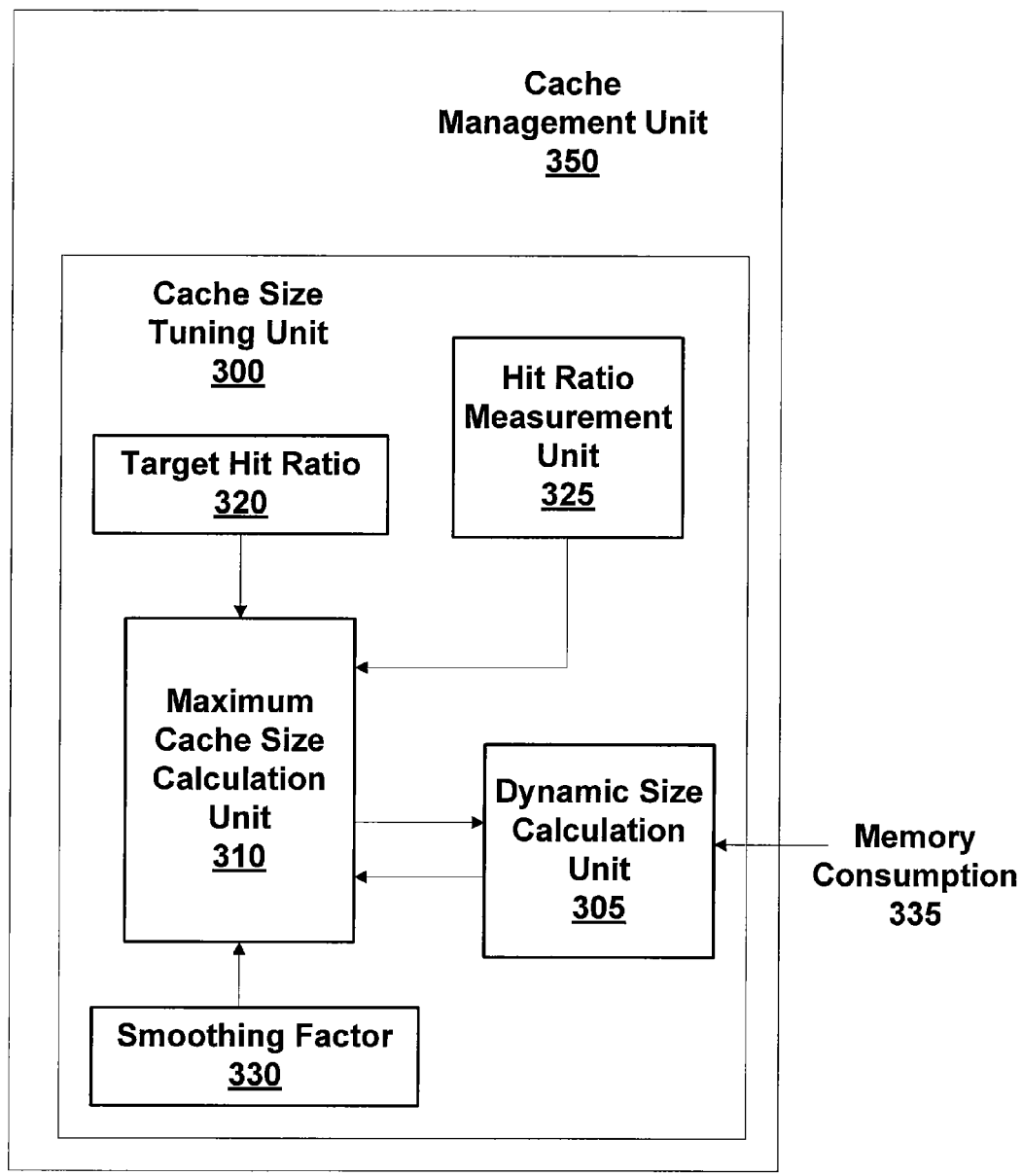
FIG. 3 is a diagram of a cache manager that includes a cache size tuning unit, according to one embodiment of the invention.

FIG. 3 is a diagram of a cache management unit 350 that includes a cache size tuning unit 300, according to one embodiment of the invention. In addition to performing the cache size tuning function, the cache management unit 350 performs other conventional cache functions such as invalidating cache entries, marking cache entries as dirty or clean, and the like. Unlike a conventional cache, the cache management unit 350 dynamically adjusts the size of the dynamically-sized cache 200, i.e., the number of cache entries that are stored in the shared memory 120. The cache management unit 350 tracks the locations in the shared memory 120 that store cache entries.

As the size of the dynamically-sized cache 200, increases the cache management unit 350 increases the number of locations in the shared memory 120 that store cache entries. As the size of the dynamically-sized cache 200 decreases, the cache management unit 350 invalidates cache entries in order to decrease the number of locations in the shared memory 120 that store cache entries. While increases in the size of the dynamically-sized cache 200 may be performed immediately, decreases in the size of the dynamically-sized cache 200 may be delayed. In one embodiment, a decrease is delayed until the size reduction is confirmed by two or more cache size computations performed by the dynamic size calculation unit 305. Reductions in the size of the dynamically-sized cache 200 should not be performed for intermittent cache activity since the reduced size may negatively impact performance of the dynamically-sized cache 200.

The cache size tuning unit 300 includes a maximum cache size calculation unit 310, a dynamic size calculation unit 305, and a hit ratio measurement unit 325. A target hit ratio 320 stores a target hit ratio value for the dynamically-sized cache 200 that may be a fixed value or programmable. A smoothing factor 330 stores a smoothing factor that is used to calculate the maximum cache size of the dynamically-sized cache 200 that may also be a fixed value or programmable. The hit ratio measurement unit 325 determines the cumulative hit ratio of the dynamically-sized cache 200 whenever a "put" operation is completed for the dynamically-sized cache 200. The term cumulative is used because the hit ratio is accumulated during the time between puts (or misses). In other words, there may be X cache hits before each cache miss, so the cumulative hit ratio is X/(X+1). A "put" operation is completed when data is stored in an entry of the dynamically-sized cache 200 in response to a cache miss. In one embodiment, the hit ratio measurement unit 325 determines the cumulative hit ratio of the dynamically-sized cache 200 when a cache miss occurs.

The maximum cache size calculation unit 310 is configured to compute a maximum value that limits the size of the dynamically-sized cache 200. The computed maximum size is based on a slope that is calculated over a sliding window of k sample points in time, where k is an integer greater than zero. In one embodiment k=5. The slope is the first order derivative of a cumulative hit ratio (HR) of the dynamically-sized cache 200 with respect to each corresponding size (C) of the dynamically-sized cache 200, slope=dHR/dC. The cumulative hit ratio (or current hit ratio) is provided by the hit ratio measurement unit 325 that is associated with the current cache size. In one embodiment, the sample points coincide with "put" operations. In other embodiments, the sample points may coincide with other events, such as cache misses or a specific sampling frequency. The computed maximum size is calculated using the following equation:

$$C\max(t+1) = C(t) + f * \frac{(\text{HR\_TGT} - HR(t))}{\text{slope}}. \quad \text{(Equation 1)}$$

HR_TGT is the target hit ratio 320, HR(t) is the cumulative hit ratio provided by the hit ratio measurement unit 325 at time t, C(t) is the cache size at time t, Cmax(t+1) is the maximum cache size at time t+1, and f is a smoothing factor. In one embodiment a smoothing factor of 0.9 is used and a target hit ratio of 97% is used.

The current size of the cache, C(t) is provided to the maximum cache size calculation unit 310 by the dynamic size calculation unit 305. The maximum cache size calculation unit 310 outputs Cmax(t+1) to the dynamic size calculation unit 315. The dynamic size calculation unit 305 is configured to adjust the size of the dynamically-sized cache 200 and limit the maximum size of the dynamically-sized cache 200 to not exceed the calculated maximum cache size, Cmax(t+1). The dynamic size calculation unit 305 also receives memory consumption 335 that indicates the combined memory consumption of the dynamically-sized cache 200 and other data stored in the memory 120. When the memory consumption 335 crosses a high threshold value, the size of the dynamically-sized cache 200 is locked at the current size and no further tuning is performed until the memory consumption falls below the high threshold value. The high threshold value may be fixed or programmable. In one embodiment, the high threshold value is 85% of the memory 120. The high threshold value may be used to prevent a crash of the content server 125 or server farm 110 by always maintaining a predetermined amount of memory for use by an operating system.

Figure 4A:
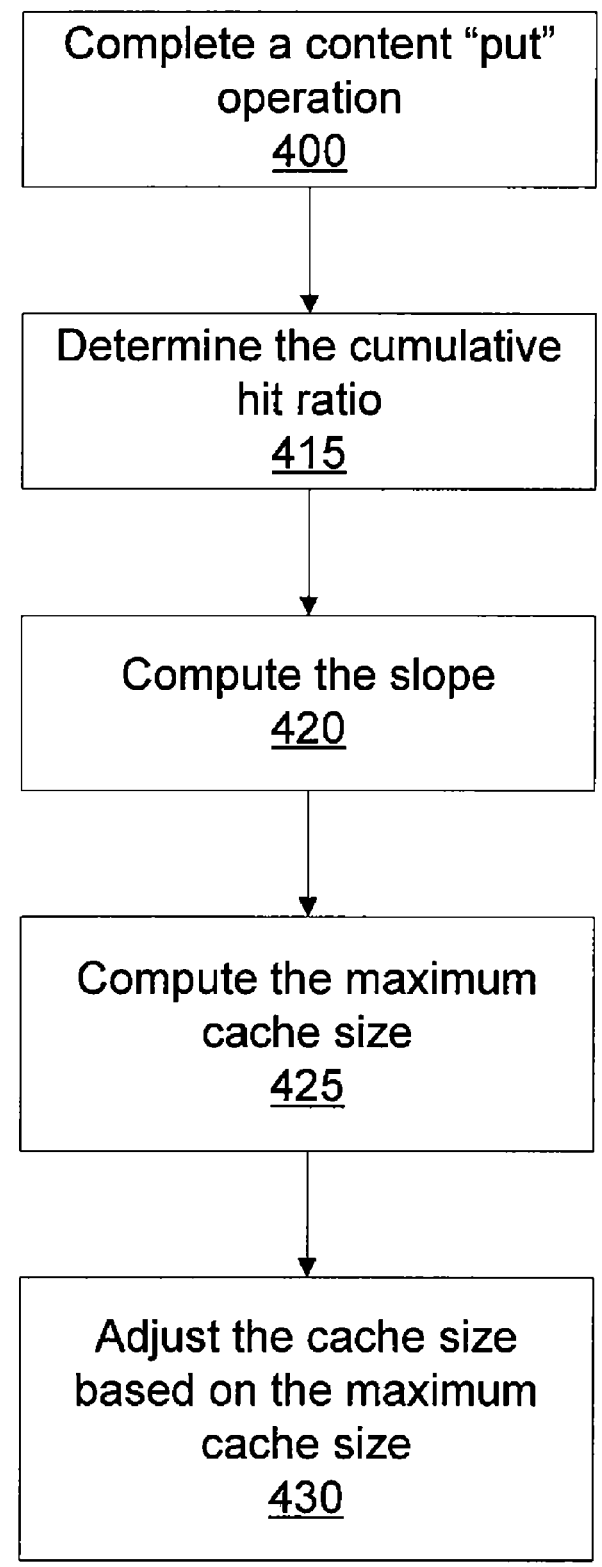
FIG. 4A is a flowchart of method steps describing the operation of the cache size tuning unit of FIG. 3, according to one embodiment of the invention.

FIG. 4A is a flowchart of method steps describing the operation of the cache size tuning unit of FIG. 3, according to one embodiment of the invention. At step 400 the cache management unit 350 completes a content "put" operation by storing content in an entry of the dynamically-sized cache 200. At step 415 the hit ratio measurement unit 325 determines the cumulative hit ratio and provides the cumulative hit ratio to the maximum cache size calculation unit 310. At step 420 the maximum cache size calculation unit 310 computes the slope using the cumulative hit ratio and the current cache size along with previously sampled cumulative hit ratio values and corresponding cache sizes. At step 425 the maximum cache size calculation unit 310 computes the maximum cache size, Cmax(t+1) and outputs Cmax(t+1) to the dynamic size calculation unit 305. At step 430 the dynamic size calculation unit 305 adjusts the size of the dynamically-sized cache 200 based on Cmax(t+1).

Figure 4B:
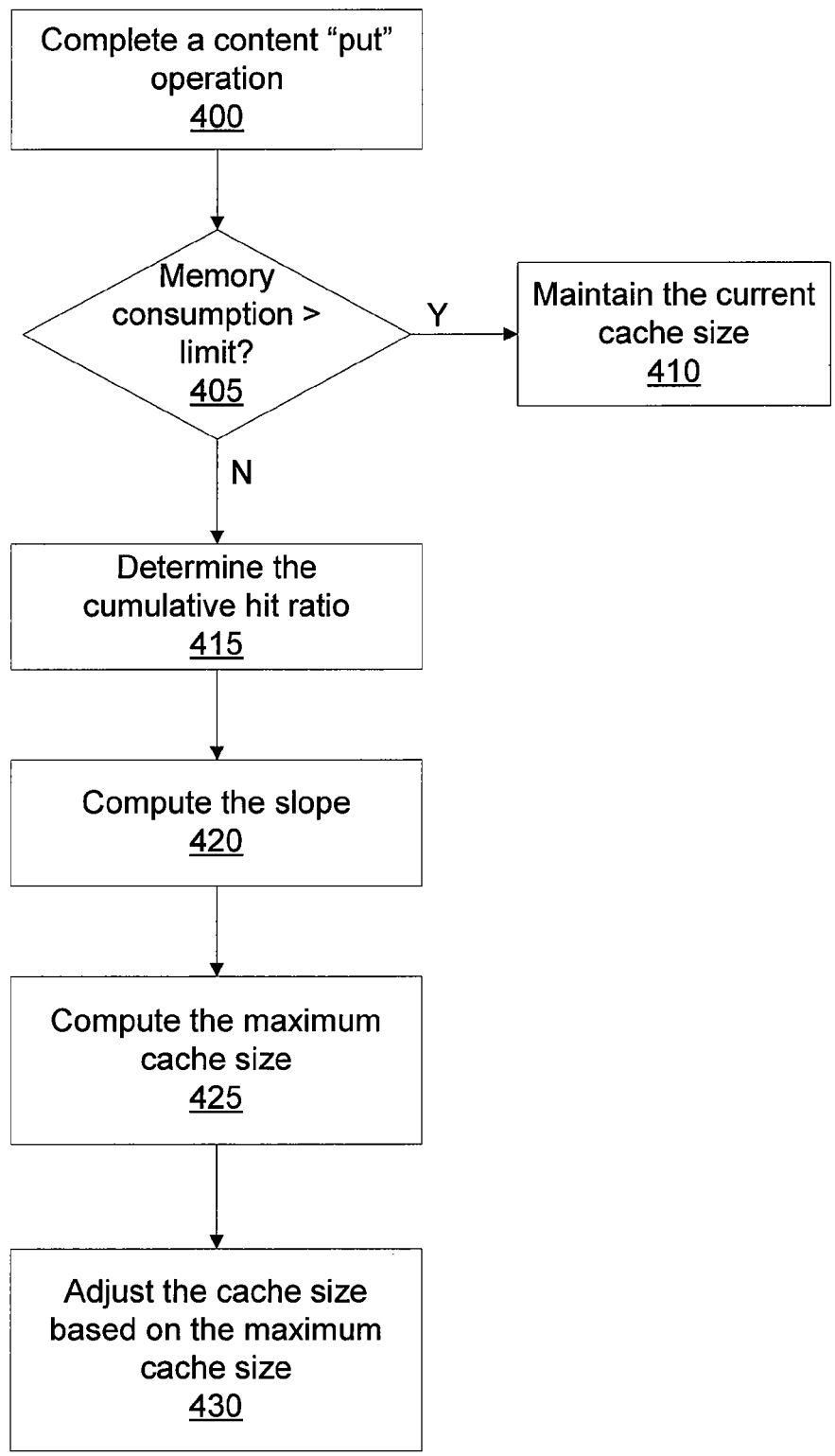
FIG. 4B is another flowchart of method steps describing the operation of the cache size tuning unit of FIG. 3, according to one embodiment of the invention.

FIG. 4B is another flowchart of method steps describing the operation of the cache size tuning unit of FIG. 3 using the memory consumption 335, according to one embodiment of the invention. At step 400 the cache management unit 350 completes a content "put" operation by storing content in an entry of the dynamically-sized cache 200. At step 405 the dynamic size calculation unit 305 determines if the memory consumption exceeds the high threshold value, and, if so, then at step 410 the current size of the dynamically-sized cache 200 is maintained. Otherwise, steps 415, 420, 425, and 430 are completed, as previously described.

One advantage of the systems and methods described herein is that, the size of the cache in the shared memory is dynamically adjusted to achieve a desired level of performance corresponding to a target hit ratio. The shared memory may be used to store more other data since the size of the cache may be reduced when the desired level of performance may be satisfied using a smaller sized cache. Yet another advantage is that the adjustments to the cache size may be performed frequently so that the cache size quickly adapts to changes in access patterns. Decreases in the size of the dynamically-sized cache may be delayed until the maximum cache size is reduced for two or more samples in order to avoid reducing the size due to an intermittent access pattern. Finally, adjustments to the size of the dynamically-sized cache may be suspended, and the size of the dynamically-sized cache may be maintained, when the memory consumption exceeds a high threshold value in order to prevent a crash of the content server.

Various embodiments of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments and numerous specific details are set forth to provide a more thorough understanding of the invention. Persons skilled in the art, however, will understand that various modifications and changes may be made thereto without departing from the broader spirit and scope of the invention. The foregoing description and drawings are, accordingly, to be regarded in an illustrative rather than a restrictive sense.

What is claimed is:

1. A computer-implemented method for tuning the size of a dynamically-sized cache in a shared memory, the method comprising:

determining a plurality of cumulative hit ratios for the dynamically-sized cache, where each cumulative hit ratio is the ratio of a first number of cache reads of data that is stored in the dynamically-sized cache (cache hits) to a sum of the first number and a second number of cache reads of data that is not stored in the dynamically-sized cache (cache misses), wherein at least one cumulative hit ratio of the plurality of cumulative hit ratios is determined when an entry in the dynamically-sized cache is filled in response to a cache miss;

computing a slope as a first order derivative of each cumulative hit ratio of the dynamically-sized cache with respect to a size of the dynamically-sized cache associated with each cumulative hit ratio;

computing, based on the slope, a maximum value that limits the size of the dynamically-sized cache in the shared memory; and adjusting the size of the dynamically-sized cache in the shared memory based on the maximum value.

2. The computer-implemented method of claim 1, wherein the maximum value is computed based on a difference between a target hit ratio for the dynamically-sized cache and a current cumulative hit ratio of the plurality of cumulative hit ratios.

3. The computer-implemented method of claim 1, wherein the maximum value is computed based on a desired level of performance corresponding to a target hit ratio for the dynamically-sized cache.

4. The computer-implemented method of claim 1, wherein the maximum value is computed based on a smoothing factor.

5. The computer-implemented method of claim 1, wherein the slope is computed by sampling the plurality of cumulative hit ratios and size of the dynamically-sized cache at multiple points in time within a sliding window.

6. The computer-implemented method of claim 1, further comprising the step of maintaining a current size of the dynamically-sized cache when the amount of the shared memory consumed by the dynamically-sized cache and other data exceeds a high threshold limit.

7. The computer-implemented method of claim 1, wherein the step of adjusting to the size of the dynamically-sized cache is delayed if an adjustment would decrease the size of the cache.

8. The computer-implemented method of claim 1, wherein the maximum value is computed by computing a difference between a target hit ratio and a current cumulative hit ratio of the plurality of cumulative hit ratios, dividing the difference by the slope and scaling the resulting quotient by a smoothing factor, and then summing the resulting scaled quotient with a current size of the dynamically-sized cache.

9. A system for tuning the size of a dynamically-sized cache in a shared memory, the system comprising:

a shared memory configured to store the dynamically-sized cache in a portion of the shared memory; and a cache management unit coupled to the shared memory and configured to:

determine a plurality of cumulative hit ratios for the dynamically-sized cache, where each cumulative hit ratio is the ratio of a first number of cache reads of data that is stored in the dynamically-sized cache (cache hits) to a sum of the first number and a second number of cache reads of data that is not stored in the dynamically-sized cache (cache misses), wherein at least one cumulative hit ratio of the plurality of cumulative hit ratios is determined when an entry in the dynamically-sized cache is filled in response to a cache miss;

compute a slope as a first order derivative of each cumulative hit ratio of the dynamically-sized cache with respect to a size of the dynamically-sized cache associated with each hit ratio;

compute, based on the slope, a maximum value that limits the size of the dynamically-sized cache stored in the shared memory; and adjust the size of the dynamically-sized cache in the shared memory based on the maximum value.

10. The system of claim 9, wherein the cache management unit is further configured to compute the maximum value based on a difference between a target hit ratio for the dynamically-sized cache and a current cumulative hit ratio of the plurality of cumulative hit ratios.

11. The system of claim 9, wherein the cache management unit is further configured to compute the maximum value based on a desired level of performance corresponding to a target hit ratio for the dynamically-sized cache.

12. The system of claim 9, wherein the cache management unit is further configured to compute the maximum value based on a smoothing factor.

13. The system of claim 9, wherein the cache management unit is further configured to compute the slope by sampling plurality of cumulative hit ratios and size of the dynamically-sized cache at multiple points in time within a sliding window.

14. The system of claim 9, wherein the cache management unit is further configured to maintain a current size of the dynamically-sized cache when the amount of the shared memory consumed by the dynamically-sized cache and other data exceeds a high threshold limit.

15. The system of claim 9, wherein the cache management unit is further configured to delay an adjustment to the size of the dynamically-sized cache if the adjustment would decrease the size of the cache.

16. The system of claim 9, wherein the cache management unit is further configured to compute the maximum value by computing a difference between a target hit ratio and a current cumulative hit ratio of the plurality of cumulative hit ratios, dividing the difference by the slope and scaling the resulting quotient by a smoothing factor, and then summing the resulting scaled quotient with a current size of the dynamically-sized cache.

17. A non-transitory computer-readable medium storing instructions that, when executed by a processor, cause a computer system to tune the size of a dynamically-sized cache in a shared memory, by performing an operation comprising:

determining a cumulative hit ratio for the dynamically-sized cache as the ratio of a first number of cache reads of data that is stored in the dynamically-sized cache (cache hits) to a sum of the first number and a second number of cache reads of data that is not stored in the dynamically-sized cache (cache misses), wherein at least one cumulative hit ratio of the plurality of cumulative hit ratios is determined when an entry in the dynamically-sized cache is filled in response to a cache miss;

computing a slope as a first order derivative of the cumulative hit ratio of the dynamically-sized cache with respect to a size of the dynamically-sized cache associated with each cumulative hit ratio;

computing, based on the slope, a maximum value that limits the size of the dynamically-sized cache in the shared memory; and adjusting the size of the dynamically-sized cache in the shared memory based on the maximum value.

18. The non-transitory computer-readable medium of claim 17, wherein each cumulative hit ratio of the plurality of cumulative hit ratios is determined when an entry in the dynamically-sized cache is filled in response to a cache miss, wherein the maximum value is computed by a cache management unit, wherein the cache management unit is configured to:

in a first instance, compute the maximum value based on a difference between a target hit ratio for the dynamically-sized cache and a current cumulative hit ratio of the plurality of cumulative hit ratios;

in a second instance, compute the maximum value based on a desired level of performance corresponding to a target hit ratio for the dynamically-sized cache;

in a third instance, compute the maximum value based on a smoothing factor.

19. The non-transitory computer-readable medium of claim 18, wherein the slope is computed by sampling the plurality of cumulative hit ratios and size of the dynamically-sized cache at multiple points in time within a sliding window, wherein the operation further comprises:

maintaining a current size of the dynamically-sized cache when the amount of the shared memory consumed by the dynamically-sized cache and other data exceeds a high threshold limit;

wherein the step of adjusting to the size of the dynamically-sized cache is delayed if an adjustment would decrease the size of the cache.

20. The non-transitory computer-readable medium of claim 19, wherein the cache management unit is configured to compute the maximum value in the first instance by computing the difference between the target hit ratio and the current cumulative hit ratio of the plurality of cumulative hit ratios, dividing the difference by the slope and scaling the resulting quotient by a smoothing factor, and then summing the resulting scaled quotient with a current size of the dynamically-sized cache, wherein the cache management unit comprises a cache size tuning unit, wherein the cache size tuning unit comprises:

a maximum cache size calculation unit configured to compute the maximum value in the first, second and third instances, respectively;

a dynamic size calculation unit configured to adjust the size of the dynamically-sized cache in the shared memory based on the maximum value; and a hit ratio measurement unit configured to determining the plurality of cumulative hit ratios for the dynamically-sized cache.

* * * * *